United States Patent
Gagnon

[15] 3,704,538
[45] Dec. 5, 1972

[54] WATERFOWL DECOY

[72] Inventor: Kenneth M. Gagnon, 302 Reservoir Avenue, Lincoln, R.I. 02865

[22] Filed: June 15, 1971

[21] Appl. No.: 153,367

[52] U.S. Cl. ...................................................43/3
[51] Int. Cl. ..............................................A01m 31/06
[58] Field of Search ....................43/3, 2; 46/92, 173

[56] References Cited

UNITED STATES PATENTS

| | | |
|---|---|---|
| 93,293 | 8/1869 | Foster ......................................43/3 |
| 1,444,342 | 2/1923 | Godward..................................43/3 |
| 2,622,360 | 12/1952 | Bertram ...................................43/3 |
| 3,478,459 | 11/1969 | Gazalski...................................43/3 |
| 3,509,656 | 5/1970 | Woolworth...............................43/3 |

*Primary Examiner*—Warner H. Camp
*Attorney*—Herbert B. Barlow et al.

[57] ABSTRACT

An air inflatable waterfowl decoy comprised of separable head and body portions. The head portion has a neck having annular ridges formed adjacent its bottom. The body portion is a flexible shell having a neck socket formed along its top forward area. A plurality of vertically spaced annular recesses are formed within the neck socket for matingly engaging the annular ridges on the neck to position the head of the decoy at a plurality of different vertical locking positions. Formed integrally and internally within the shell is a valve seat sleeve into which is inserted the plug valve used to inflate the body portion. A keel positioned along the bottom surface of the body portion has grooves at opposite ends for receiving an anchor line wound therearound when the decoy is not in use. It also has identical cavities at its opposite ends so that a mating protuberance on the anchor weight may be lockingly received at either end of the keel. The keel may also be detachable; thus the decoy can be used on land as well as upon water.

7 Claims, 6 Drawing Figures

PATENTED DEC 5 1972
3,704,538
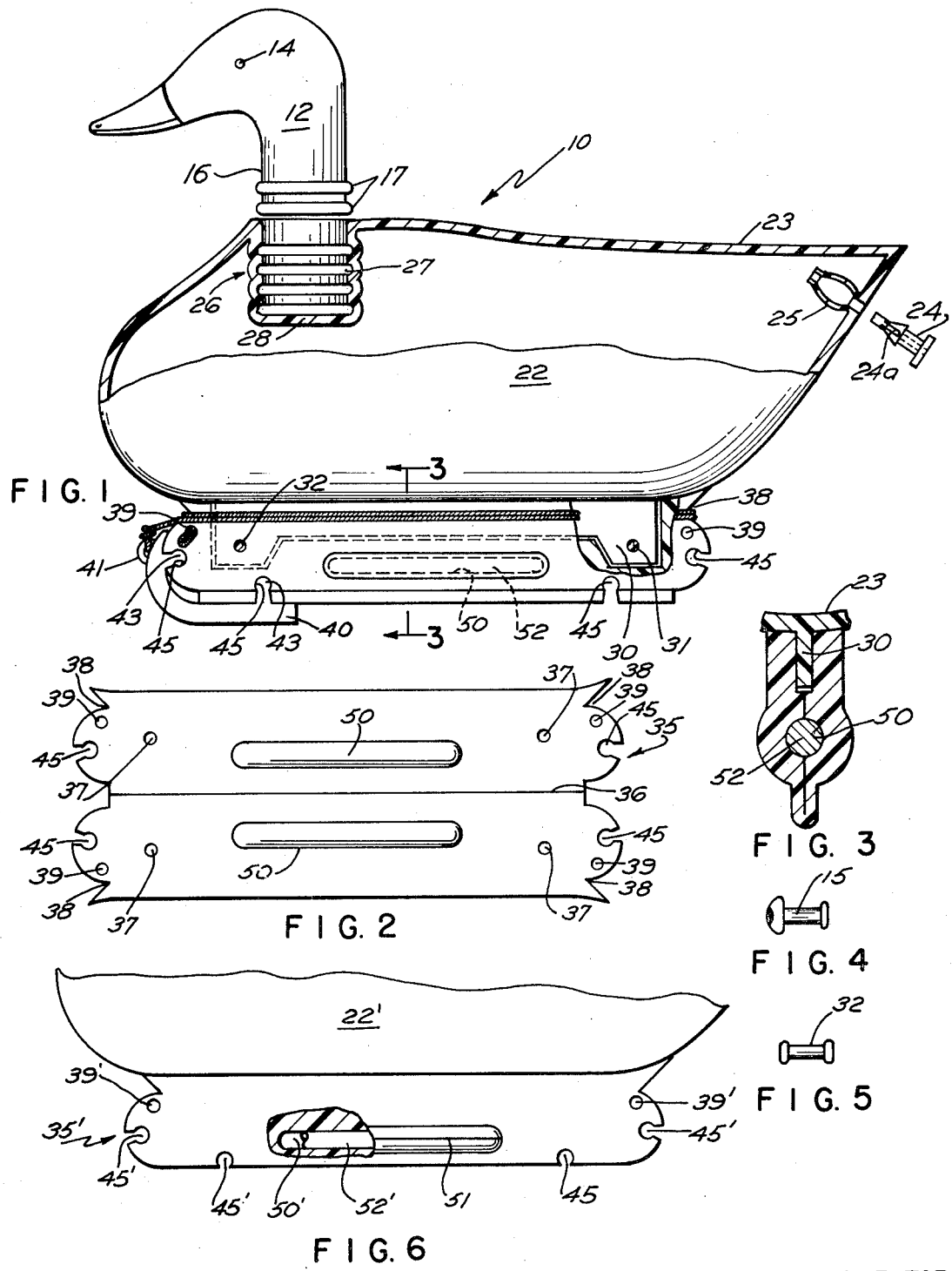
INVENTOR
KENNETH M. GAGNON
BY
Barlow & Barlow
ATTORNEYS

WATERFOWL DECOY

BACKGROUND OF THE INVENTION

The present invention relates to waterfowl decoys and more particularly to an inflatable decoy. The use of decoys to lure game birds within the range of the hunter have long been known. Initially these decoys were carved from wood making their manufacture a costly and time consuming process. One of the major disadvantages of the wooden decoy was its size and weight which made the job of transporting them to and from the duck blind a burdensome chore. In order to alleviate the weight problem, newer designed decoys were next formed of lighter compositions such as treated paperboard. These decoys remained bulky and in addition the composition materials had a tendency to become waterlogged with time. Most recent efforts have been directed toward perfecting an inflatable decoy having characteristics suitable to portraying live waterfowl. Some of these inflatable decoys have proved less than satisfactory because they fail to respond properly to wind conditions and fail to portray a natural looking waterfowl on the water. Other problems relate to the manner in which an anchor line is attached thereto and also to the problem of entanglement of the anchor lines when the decoys are stored or carried to and from the duck blind.

SUMMARY OF THE INVENTION

Applicant's waterfowl decoy has been designed to overcome the disadvantages of prior decoys. It is comprised of two basic members, a head portion and a body portion. Both are hollow and made of a flexible material to produce a decoy which is light in weight. Both portions are compressible when not being used thus allowing a large number of decoys to be carried to and from the duck blind in a relatively small bag. The body portion has a unique integrally molded valve seat sleeve formed internally into which is inserted a plug valve used to inflate and seal the inflatable body portion. The neck of the head portion has a plurality of annular ridges formed adjacent its lower end which mate with vertically spaced annular recesses formed in the neck socket which is located along the top forward portion of the body portion. As can clearly be seen, the neck is thus vertically positionable in a variety of different positions to more closely simulate live waterfowl in their different poses. The heads are also rotatable which lends additional realism when the heads are pointed in different directions when placed in the water. The bottom of the body portion has a keel which may be either integrally formed thereon or detachable which allows the decoy to be used upon the land as well as in the water. The keel is designed with recesses at both its forward and rearward ends. The anchor line may be neatly wrapped around these recesses when not in use. Also identical cavities are formed at the forward and rearward ends to lockably engage a mating protuberance on the anchor weight. It is thus seen that when the decoy is not in use it can be compactly stored with its anchor line and anchor neatly secured which will thus prevent unnecessary entanglement of a plurality of decoys stored in the same bag.

It is an object of the invention to provide novel means for holding an anchor on a decoy and to provide novel means for disposing of the anchor line when the decoy is not in use.

It is an object of the invention to provide a decoy which is easily, quickly, and with a minimum of difficulty extensible and collapsible.

It is an object of the invention to provide a light weight decoy which is of small bulk when collapsed so that a hunter may readily carry a goodly number of them with ease.

It is an object of the invention to provide a decoy made from a rugged material, which will seal itself when punctured by stray shot.

It is an object of the invention to provide a decoy which can be manufactured easily and at a relatively small cost compared to the wooden decoys.

It is another object of the invention to provide an inflatable decoy which may be used on land or in the water.

A further object of the invention is to provide an inflatable decoy having a valve receiving housing formed integrally within the body portion of the decoy.

An additional object of the invention is to provide an inflatable decoy comprised of separable head and body portions wherein the head portion is both vertically lockable and rotatably adjustable with respect to the body portion.

DESCRIPTION OF THE DRAWINGS

FIG. 1 is a side elevation of the waterfowl decoy showing various areas cut away for increased clarity;

FIG. 2 is a top plan view of the detachable keel laid out in its open position;

FIG. 3 is a cross section taken along lines 3—3 of FIG. 1;

FIG. 4 is a side elevation view of an eye of the waterfowl decoy;

FIG. 5 is a side elevation view of a pin; and

FIG. 6 is a partial side elevation view of an alternative embodiment having an integrally formed keel, a portion of which is broken away for clarity.

DESCRIPTION OF THE PREFERRED EMBODIMENT

The waterfowl decoy is generally designated numeral 10 and is comprised of two hollow collapsible parts, head portion 12 and body portion 22. These members are preferably made of a plastic composition, for example, such as thermoplastic rubber, which is light in weight and which may be folded or rolled into a small compact unit. This allows a hunter to carry a large number of decoys. The plastic material comprising the decoy may be imprinted, sprayed and handpainted, or otherwise suitably colored so as to simulate the appearance of the species of water fowl that it is desired to attract. The size of the head portion 12 is such that it is not necessary that it have an air inflation stem and valve. The head portion is hollow inside and is normally made of a thickness of thermoplastic rubber greater than that of the body portion such that it springs back to lifesize after any compressive forces on it have been removed. Eye appertures 14 are formed on opposite sides of the head and receive eye members 15 (shown in FIG. 4). The eyes are made of clear styrene and are snapped into the apertures 14. Extending downwardly from the head portion is a neck 16 having annular ridges 17 formed adjacent its base.

As illustrated in FIG. 1, the body portion is basically formed with an outer shell 23 made of a flexible material which is easily collapsible for compact storage. A valve seat sleeve 25 is integrally molded along the internal surface of the rear wall. Valve 24 is inserted therein to inflate the body portion by directing air inwardly through the bore and then out through its ports 24a. After the body is inflated, valve 24 is pushed inwardly until its flange or shoulder rests against the outer wall of the shell thus sealing the ports 24a against the walls of sleeve 25 and preventing the escape of the air. The neck socket 26 is formed in the body portion at a position located along its top forward area. It is comprised of a plurality of vertically spaced recesses 27 which are formed one after another downwardly to the bottom wall 28 of the socket. The annular recesses 27 matingly engage the annular ridges 17 of the head portion to provide a positive positioning of the head with respect to the body. Thus it can be seen that the head of the decoy may be adjustably positioned at a plurality of different heights above the body giving it a more likelike appearance when set out in position in the water. The resilience of the material from which the head portion and the body portion are made make the neck easily adjustable from one position to another, yet provide a positive locking engagement therebetween the two at any of the desired positions. The annular ridges also permit rotational movement of the head with respect to the body portion throughout a 360° arc. Maximum realism is thus obtained when a set of 20 or 30 decoys are placed in the water so that some may be positioned with their heads in the lowermost position while others have their heads fully extended while at the same time different angular deployments of the head with respect to the body are possible. Integrally molded to the bottom of the body portion of the decoy illustrated in FIG. 1 is a ridge 30. Detachably mounted over this ridge is a keel 35 which is shown in FIG. 2 in a laid out open position. The keel is attached to the ridge by folding it along its hinge portion 36, mating its apertures 37 with apertures 31 in the ridge member and then inserting pins 32 therethrough. The pins (see FIG. 5) are preferably formed of rubber or some other resilient material whose head will be compressed when inserted through the aligned apertures only to expand once through thus locking the keel in place.

The keel has grooves 38 formed thereon around which the anchor line is wound. The anchor line is attached to one of the apertures 39 formed at the forward or rearward end of the keel. Weight 40 at the end of the anchor line may be attached to either the forward or aft area of the keel. The weight illustrated in FIG. 1 is shown having an eyelet 41 formed along its forward surface and having protuberances 43 formed along its top surface. Cavities 45 formed in the fore and aft positions of the keel matingly receive the protuberances 43 to positively position the weight with respect to the keel. It is thus seen that the weight can be secured either at the forward or rearward position of the keel for storage purposes. Apertures 39 formed in the keel receive one end of the anchor line and provide versatility so that the anchor may be attached at either the forward or rearward area of the decoy.

Inserted within a hollow pocket 50 in the keel is ballast weight 52 (see FIG. 3).

An alternative embodiment is illustrated in FIG. 6 showing an integral keel 35' molded to the bottom of body portion 22". It is formed with a hollow pocket 50' therein which is slit along seam 51 to allow for insertion of ballast weight 52' therein. After the ballast has been inserted, the seam 51 is fused together again. The integrally molded keel 35' is otherwise essentially identical to the detachable keel illustrated in FIG. 1 and the anchor weight 40 would be attached thereto in a similar manner.

What is claimed is:

1. A waterfowl decoy comprising
   a. a head portion having a neck protruding downwardly therefrom
   b. a body portion
   c. said body portion comprising an air inflatable shell having a neck socket formed along its top forward area
   d. means formed within said neck socket and means formed along the lower area of said neck for detachably securing said head and body portion together at predetermined locking positions whereby the head of the decoy may be positioned at various heights above the body to more closely simulate the various poses struck by live waterfowl.

2. A waterfowl decoy as recited in claim 1 further comprising a keel positioned along the bottom surface of said body portion, said keel having groove means for receiving an anchor line wound therearound when the decoy is not in use.

3. A waterfowl decoy as recited in claim 2 wherein there are identically shaped cavities formed at the opposite ends of said keel whereby an anchor protuberance which mates with said cavities may be locked at either end of said keel when the decoy is not in use.

4. A waterfowl decoy as recited in claim 2 wherein said keel is a detachable member and the bottom surface of said body portion has means thereon for detachably securing said keel thereto whereby when the keel is removed the decoy may be used on land.

5. A waterfowl decoy as recited in claim 1 wherein said inflatable shell has an integrally molded valve seat sleeve extending into the interior of said shell which receives a removable plug valve.

6. A waterfowl decoy as recited in claim 1 wherein said means formed within said neck socket comprise a plurality of annular recesses formed one above another along the interior of said socket.

7. A waterfowl decoy as recited in claim 6 wherein said means formed along the lower area of said neck comprise at least one annular ridge which is matingly engageable in said annular recesses.

* * * * *